(12) United States Patent
Imabayashi et al.

(10) Patent No.: US 6,678,030 B2
(45) Date of Patent: Jan. 13, 2004

(54) LIQUID CRYSTAL DISPLAY DEVICE

(75) Inventors: Makiko Imabayashi, Mobara (JP); Shinji Hasegawa, Mobara (JP); Yasushi Iwakabe, Oami (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 09/903,492

(22) Filed: Jul. 13, 2001

(65) Prior Publication Data

US 2002/0005929 A1 Jan. 17, 2002

(30) Foreign Application Priority Data

Jul. 14, 2000 (JP) ........................................ 2000-213753

(51) Int. Cl.⁷ ............................................... G02F 1/339
(52) U.S. Cl. ......................... 349/155; 349/156; 349/157
(58) Field of Search ................................ 349/155, 157, 349/158, 156

(56) References Cited

U.S. PATENT DOCUMENTS

| | | | | | |
|---|---|---|---|---|---|
| 5,381,255 | A | * | 1/1995 | Ohnuma et al. | 349/106 |
| 5,812,232 | A | * | 9/1998 | Shiroto et al. | 349/157 |
| 5,978,061 | A | * | 11/1999 | Miyazaki et al. | 349/155 |
| 6,187,440 | B1 | * | 2/2001 | Wu | 428/407 |

* cited by examiner

*Primary Examiner*—Robert H. Kim
*Assistant Examiner*—Jeanne Di Grazio

(57) ABSTRACT

There is provided a liquid crystal display device in which the gap between its transparent substrates can be kept uniform irrespective of whether the temperature of the device is normal temperature or high temperature. The liquid crystal display device includes transparent substrates disposed in opposition to each other with a liquid crystal being interposed therebetween, and plural spacers secured to one of the transparent substrates so as to support the other transparent substrate. The plural spacers include first spacers and second spacers, and the first spacers are formed of a material whose elasticity is higher than that of the second spacers, and are larger in height than the second spacers.

6 Claims, 5 Drawing Sheets

LIQUID CRYSTAL DISPLAY DEVICE

BACKGROUND OF THE INVENTION

1. Field of the Invention

The present invention relates to a liquid crystal display device.

2. Background Art

Liquid crystal display devices have a vessel made of transparent substrates disposed in opposition to each other with a liquid crystal being interposed therebetween, and a display part made of multiple pixels arranged in the spreading direction of the liquid crystal.

Either one of the transparent substrates is secured to the other transparent substrate by a sealing material which also serves the function of sealing the liquid crystal, and the gap between the transparent substrates in the display is retained by spacers scattered in the liquid crystal.

A recently known example of the spacers is a resin layer which is formed in a columnar shape on either one of the transparent substrates by selective etching using a photolithography technique.

The spacers formed in this manner have the advantage of being able to be formed with high accuracy at predetermined positions in the display part as well as the advantage of being able to be made uniform in height.

However, it has been observed that when the temperature of such a liquid crystal display device reaches a high temperature owing to heat generated from a backlight or the like, the liquid crystal thermally expands and one of the transparent substrates separates from the spacers formed on the other. This is because the thermal expansion of the spacers cannot follow the thermal expansion of the liquid crystal.

As a result, the gap between the transparent substrates, that is, the layer thickness of the liquid crystal, cannot be made uniform, and a deflection occurs in at least either one of the transparent substrates.

Even when the temperature of the device returns to a normal temperature, the deflection of the transparent substrate does not easily disappear, and offers a problem which causes the irregular display image.

SUMMARY OF THE INVENTION

The invention has been made in view of the above-described problems, and provides a liquid crystal display device in which the gap between its transparent substrates can be made uniform irrespective of whether the temperature of the device is normal temperature or high temperature.

A representative aspect of the invention disclosed will be described below in brief.

A liquid crystal display device according to the invention includes transparent substrates disposed in opposition to each other with a liquid crystal being interposed therebetween, and plural spacers secured to one of the transparent substrates so as to support the other transparent substrate. The plural spacers include first spacers and second spacers, and the first spacers are formed of a material whose elasticity is higher than that of the second spacers, and are larger in height than the second spacers.

In the liquid crystal display device constructed in this manner, before the temperature of the device becomes high, the gap between the transparent substrates is retained according to the height of the second spacers. In this case, the first spacers are in the state of being shrunk owing to their elasticity.

When the temperature becomes high and the liquid crystal thermally expands, either one of the transparent substrates separates from the second spacers, but does not separate from the first spacers. This is because the first spacers are in the state of being expanded owing to their elasticity.

When the temperature returns to normal temperature, the first spacers are brought to the state of being shrunk owing to their elasticity, and the gap between the transparent substrates is retained according to the height of the second spacers.

Accordingly, a deflection does not occur in either of the transparent substrates, and the gap between the transparent substrates can be kept uniform irrespective of whether the temperature of the device is normal temperature or high temperature.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

Embodiments of a liquid crystal display device according to the invention will be described below in detail with reference to the accompanying drawings.

Embodiment 1

<<Equivalent Circuit>>

Figure 2:
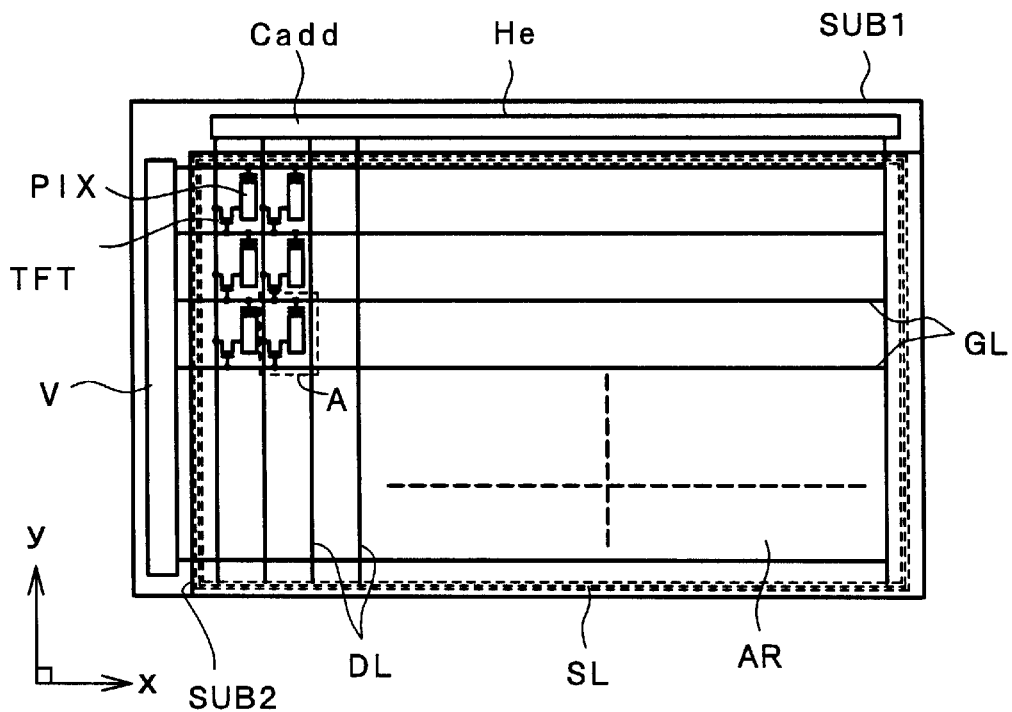
FIG. 2 is an equivalent-circuit diagram of the essential portion of the one embodiment of the liquid crystal display device according to the invention.

FIG. 2 is an equivalent circuit diagram showing one embodiment of a liquid crystal display device according to the invention. FIG. 2 is a circuit diagram which describes the actual geometrical layout of the liquid crystal display device.

Figure 1:
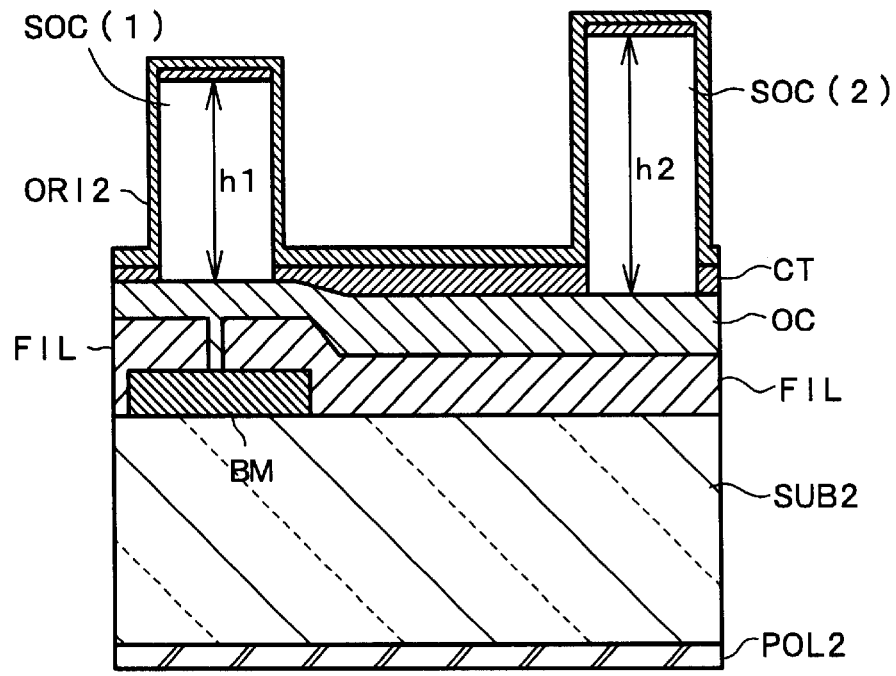
FIG. 1 is a cross-sectional view of the essential portion of one embodiment of a liquid crystal display device according to the invention.

In FIG. 1, there is shown a transparent substrate SUB1 which is disposed in opposition to another transparent substrate SUB2 with a liquid crystal interposed therebetween.

Gate signal lines GL and drain signal lines DL are formed on a liquid-crystal-side surface of the transparent substrate SUB1. The gate signal lines GL are disposed to be extended in the x direction and to be placed side by side in the y direction as viewed in FIG. 2, while the drain signal lines DL are insulated from the gate signal lines GL and are disposed to be extended in the y direction and to be placed side by side in the x direction as viewed in FIG. 2. Rectangular areas each of which is surrounded by adjacent ones of the gate signal lines GL and adjacent ones of the drain signal lines DL constitute pixel areas, respectively, and a display part AR is formed by a combination of these pixel areas.

A thin film transistor TFT and a pixel electrode PIX are formed in each of the pixel areas. The thin film transistor TFT is driven by the supply of a scanning signal (voltage) from one of the adjacent gate signal lines GL, and a video signal (voltage) is supplied to the pixel electrode PIX from one of the adjacent drain signal lines DL via the thin film transistor TFT.

An capacitance element Cadd is formed between the pixel electrode PIX and the other of the adjacent gate signal lines GL so that when the thin film transistor TFT is turned off, a video signal supplied to the pixel electrode PIX is stored in the capacitance element Cadd for a long time.

The pixel electrode PIX in each of the pixel areas is arranged to generate an electric field between the pixel electrode PIX and a counter electrode CT (not shown) formed in common to each of the pixel areas on a liquid-crystal-side surface of the other transparent substrate SUB2 which is disposed in opposition to the transparent substrate SUB1 with the liquid crystal interposed therebetween. The optical transmissivity of the liquid crystal between each of the pixel electrodes PIX and the counter electrode CT is controlled by the electric field.

One end of each of the gate signal lines GL is formed to be extended to one side (in FIG. 2, the left-hand side) of the transparent substrate SUB1, and the extended portion is connected to a vertical scanning circuit V made of a semiconductor integrated circuit mounted on the transparent substrate SUB1. In addition, one end of each of the drain signal lines DL is formed to be extended to one side (in FIG. 2, the top side) of the transparent substrate SUB1, and the extended portion is connected to a video signal driver circuit He made of a semiconductor integrated circuit mounted on the transparent substrate SUB1.

The transparent substrate SUB2 is disposed in opposition to the transparent substrate SUB1 in such a manner as to avoid an area in which are mounted the semiconductor circuits which respectively constitute the vertical scanning circuit V and the video signal driver circuit He, and the area of the transparent substrate SUB2 is smaller than that of the transparent substrate SUB1.

The transparent substrate SUB2 is secured to the transparent substrate SUB1 by a sealing material SL formed in the periphery of the transparent substrate SUB2, and this sealing material SL also has the function of sealing the liquid crystal between the transparent substrates SUB1 and SUB2.

<<Construction of Pixel>>

Figure 3:
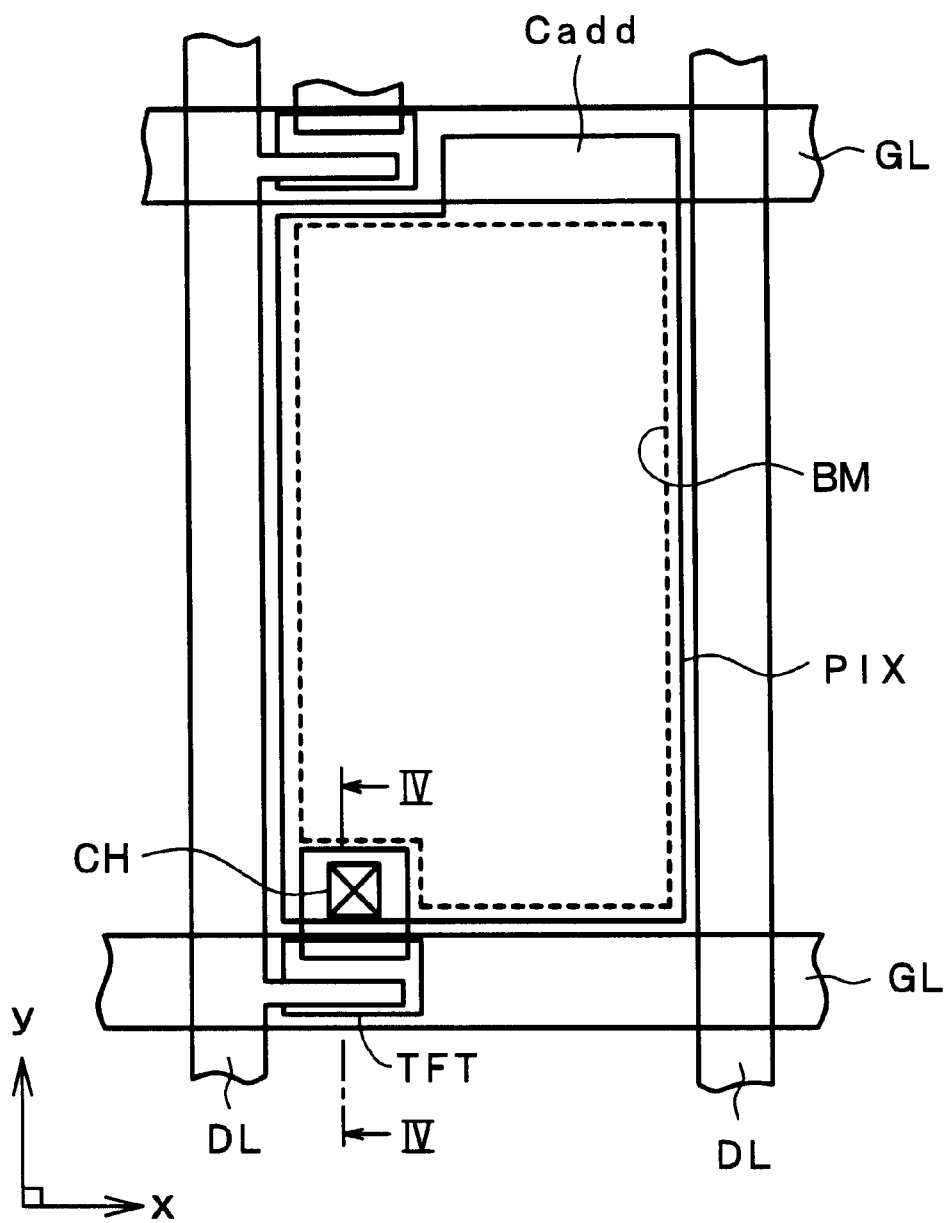
FIG. 3 is a plan view of one embodiment of a pixel of the liquid crystal display device according to the invention.

FIG. 3 is a plan view showing the construction of one pixel area of the transparent substrate SUB1, and is a view corresponding to the portion shown in a dotted frame A of FIG. 2.

Figure 4:
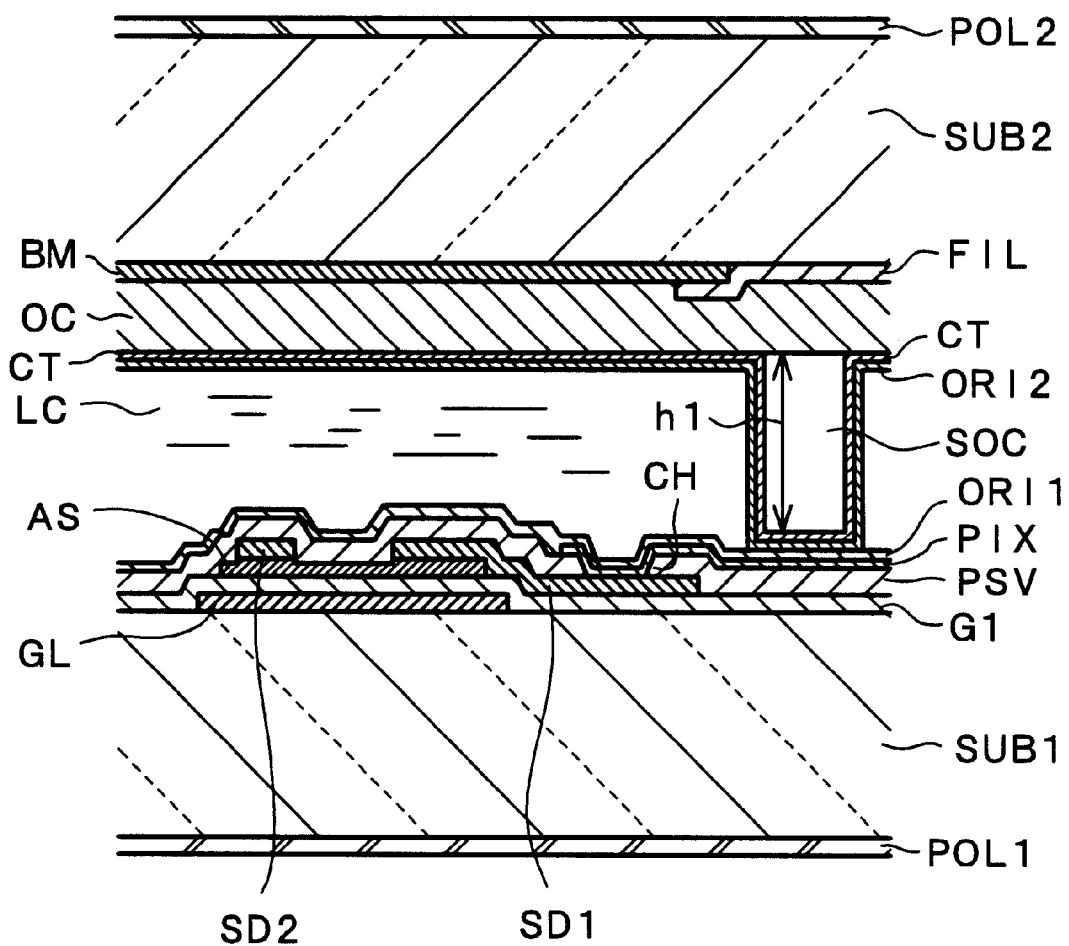
FIG. 4 is a cross-sectional view taken along line IV—IV of FIG. 3.

FIG. 4 shows a cross-sectional view taken along line IV—IV of FIG. 3, and also shows a cross-sectional view of the transparent substrate SUB2.

Referring first to FIG. 3, the gate signal lines GL disposed to be extended in the x direction of FIG. 3 and to be placed side by side in the y direction of FIG. 3 are formed on the liquid-crystal-side surface of the transparent substrate SUB1.

An insulating film GI made of, for example, SiN is formed on the liquid-crystal-side surface of the transparent substrate SUB1 so as to cover the gate signal lines GL.

This insulating film GI has the function of an interlayer insulating film between the gate signal lines GL and the drain signal lines DL which will be described later, the function of gate insulating films with respect to the thin film transistors TFT which will be described later, and the function of dielectric films with respect to the capacitance elements Cadd which will be described later.

A semiconductor layer AS of the i type (intrinsic: not doped with a conductivity type determining impurity) made of, for example, a-Si is formed on the portion of the insulating film GI which is superposed on the gate signal line GL in the bottom left portion of the pixel area, as viewed in FIG. 3.

A source electrode SD1 and a drain electrode SD2 are formed on the upper surface of the semiconductor layer AS, thereby forming a semiconductor layer of a MIS type of thin film transistor TFT which uses part of the gate signal line GL as its gate electrode.

These source electrode SD1 and drain electrode SD2 are formed at the same time that the drain signal lines DL are formed on the insulating film GI. Specifically, the drain signal lines DL are formed to be extended in the x direction and to be placed side by side in the y direction as viewed in FIG. 3. In the shown pixel area, part of the drain signal line DL is formed to be extended onto the upper surface of the semiconductor layer AS, whereby the extended portion is formed as the drain electrode SD2 of the thin film transistor TFT.

An electrode which is formed apart from the drain electrode SD2 at this time constitutes the source electrode SD1. This source electrode SD1 is connected to the pixel electrode PIX which will be described later, and has a pattern having an extended portion which is extended to a small extent toward the central side of the pixel area for the purpose of ensuring the portion of connection between the source electrode SD1 and the pixel electrode PIX.

Incidentally, a semiconductor layer doped with an impurity is formed at the interface between the semiconductor layer AS and each of the drain electrode SD2 and the source electrode SD1. This semiconductor layer functions as a contact layer.

After the semiconductor layer AS has been formed, a thin semiconductor layer doped with an impurity is formed on the surface of the semiconductor layer AS, the drain electrode SD2 and the source electrode SD1 are formed, and then the exposed portion of the impurity-doped layer that is not covered with the electrodes SD1 and SD2 is etched by using each of the electrodes SD1 and SD2 as a mask, thereby providing the above-described construction.

A protective film PSV which is made of, for example, SiN and covers the drain signal lines DL (the drain electrode SD2 and the source electrode SD1) and the like is formed on the surface of the transparent substrate SUB1 on which the drain signal lines DL and the like are formed in this manner.

This protective film PSV is provided for preventing the thin film transistor TFT from coming into direct contact with the liquid crystal, and a contact hole CH for exposing part of the extended portion of the source electrode SD1 of the thin film transistor TFT is formed in the protective film PSV.

The transparent pixel electrode PIX made of, for example, ITO (Indium-Tin-Oxide) film is formed on the upper surface of the protective film PVS so as to cover a major part of the pixel area.

This pixel electrode PIX is also formed to cover the contact hole CH of the protective film PSV, and is thereby connected to the source electrode SD1 of the thin film transistor TFT.

Furthermore, an alignment layer ORI1 which also covers the pixel electrode PIX is formed on the surface of the transparent substrate SUB1 on which the pixel electrode PIX is formed in this manner. This alignment layer ORI1 is made of, for example, a resin and the surface of the alignment layer ORI1 is subjected to rubbing treatment in a predetermined direction. This alignment layer ORI1 is in contact with a liquid crystal LC, and the initial alignment direction of the liquid crystal LC is determined by the alignment layer ORI1.

In addition, the surface of the transparent substrate SUB1 opposite to the liquid crystal LC is covered with a polarizer POL1.

A black matrix BM is formed on the liquid-crystal-side surface of the transparent substrate SUB2 so as to partition each of the pixel areas.

This black matrix BM is provided for preventing the thin film transistor TFT from being irradiated with external light as well as for improving the contrast of display.

A color filter FIL having colors corresponding to the respective pixel areas is formed in the apertures of the black matrix BM (which are areas through which light is to be transmitted and serve as substantial pixel areas).

This color filter FIL is arranged in such a manner that, for example, color filters for the same color are used in the respective pixel areas juxtaposed along each line in the y direction, but color filters for red (R), green (G) and blue (B) are arranged in repeated order along the respective pixel areas arranged along each line in the x direction.

In this manner, an over coat film OC made of, for example, a resin formed by application or the like is formed to cover the black matrix BM and the like on the surface of the transparent substrate SUB2 on which the black matrix BM and the color filter FIL are formed, thereby preventing steps due to the black matrix BM and the color filter FIL from appearing on the surface of the transparent substrate SUB2.

Spacers SOC are formed on the over coat film OC. These spacers SOC are formed to be scattered in the display part AR (one of the spacers SOC is shown in FIG. 4), and serves to uniformly maintain the gap between the transparent substrate SUB1 and the transparent substrate SUB2.

The spacers SOC are made of, for example, columnar resin bodies secured the transparent substrate SUB2, and are formed in such a way that a resin film is formed by forming a resin on the surface of the transparent substrate SUB2 by application and the resin film is subjected to selective etching by a photolithography technique.

According to this method, it is possible to arbitrarily form these spacers SOC in pixel areas through which light can be transmitted or in pixel areas through which no light can be transmitted.

Although the spacers SOC will be described later in further detail, the height of each of the spacers SOC (the spacer SOC shown in FIG. 4 and the spacers SOC not shown in FIG. 4) is h, when the liquid crystal display device shown in FIG. 4 is at normal temperature.

The counter electrode CT made of, for example, ITO is formed on the surface of the over coat film OC in common with the individual pixel areas in such a manner that the counter electrode CT also covers the surfaces of the spacers SOC.

This counter electrode CT serves to cause an electric field corresponding to a video signal (voltage) to be generated between the counter electrode CT and the pixel electrode PIX in each of the pixel areas, thereby controlling the optical transmissivity of the liquid crystal LC between the counter electrode CT and each of the pixel electrodes PIX.

Furthermore, an alignment film OR12 which also covers the counter electrode CT is formed on the surface of the transparent substrate SUB2 on which the counter electrode CT is formed in this manner. The alignment film OR12 is made of, for example, a resin, and has a surface subjected to rubbing treatment in a predetermined direction. This alignment film OR12 is in contact with the liquid crystal LC, and the initial alignment direction of the liquid crystal LC is determined by the alignment layer OR12.

In addition, the surface of the transparent substrate SUB1 opposite to the liquid crystal LC is covered with a polarizer POL2.

<<Spacer>>

FIG. 1 is a view showing only the transparent substrate SUB2 on which the spacers SOC are formed, and is also a view showing the state in which the transparent substrate SUB1 is not yet disposed in opposition to the transparent substrate SUB2.

Incidentally, the transparent substrate SUB2 of FIG. 4 is shown upside down in FIG. 1.

The spacers SOC formed on the transparent substrate SUB2 includes two different kinds of spacers. One kind is a spacer SOC(1) which has a height h, and is formed of more flexible material having a comparatively small elasticity. The other kind is a spacer SOC(2) which has a height $h_2(>h_1)$ and is formed of a material having a comparatively large elasticity.

The spacers SOC(1) and SOC(2) are respectively formed in separate steps. Specifically, a resin (whose modulus of elasticity is $E_1$) is applied to the upper surface of the flattening film OC to form a resin film having a thickness $h_1$ on the same, and the resin film is patterned by selective etching using a photolithography technique, thereby forming the spacer SOC(1). Then, another resin (whose modulus of elasticity is $E_2(>E_1)$) is applied to the upper surface of the over coat film OC to form a resin film having a thickness $h_2$ on the same, and the resin film is patterned by selective etching using a photolithography technique, thereby forming the spacer SOC(2).

In the case where the transparent substrate SUB1 is disposed in opposition to the transparent substrate SUB2 having these spacers SOC(1) and SOC(2) (a liquid crystal cell is formed), the gap between the transparent substrates SUB1 and SUB2 is determined by the height $h_1$ of the spacer SOC(1) as shown in FIG. 4.

In this case, because the elasticity of the spacer SOC(2) is high, the spacer SOC(2) is shrunk by the pressure from each of the transparent substrate, SUB1 and SUB2, and is interposed between the transparent substrates SUB1 and SUB2 with the height of the spacer SOC(2) being reduced to $h_1$. Accordingly, the gap between the transparent substrates SUB1 and SUB2 is maintained at approximately $h_1$, over the entire area of the display part AR.

Then, when the liquid crystal is thermally expanded due to a temperature change from normal temperature to high temperature, the gap between the transparent substrates SUB1 and SUB2 becomes greater than $h_1$ and the head of the spacer SOC(1) separates from the transparent substrate SUB1, but the spacer SOC(2) expands due to its elasticity and is retained in intimate contact with the transparent substrate SUB1.

In this case, the gap between the transparent substrates SUB1 and SUB2 varies, but since the gap does not differ among individual positions of the display part AR (that is to say, a deflection does not occur in either of the transparent substrates SUB1 and SUB2), so that display unevenness does not occur.

This advantage is similarly useful even during a reduction in temperature from high temperature to normal temperature, and the irregular display image still does not occur.

For this reason, the gap between the transparent substrates SUB1 and SUB2 can be kept uniform irrespective of whether the temperature of the device is normal temperature or high temperature.

Figure 5:
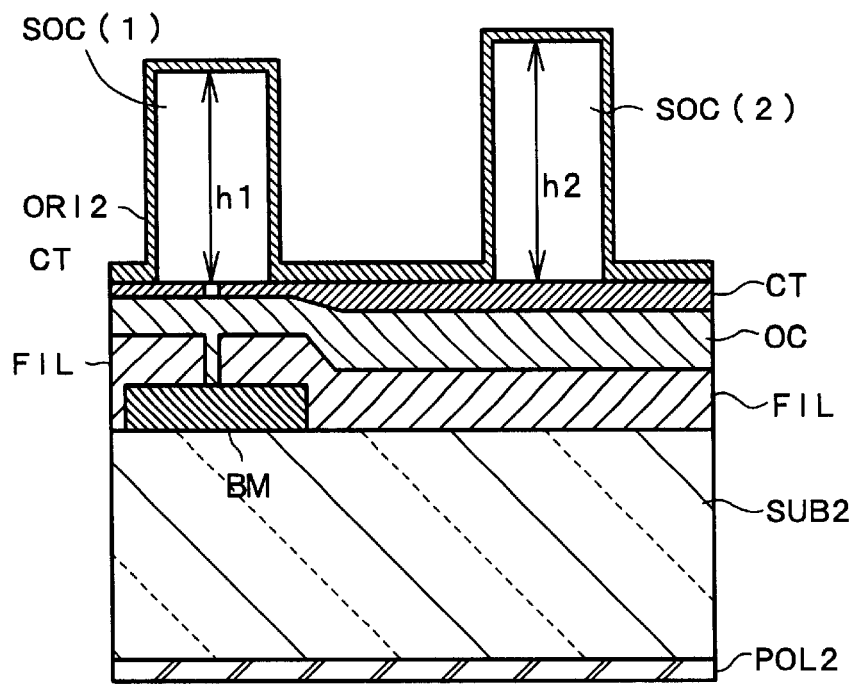
FIG. 5 is a cross-sectional view of the essential portion of another embodiment of the liquid crystal display device according to the invention.

FIG. 5 is a view showing the construction of another embodiment, and is a view corresponding to FIG. 1. FIG. 5 differs from FIG. 1 in that the counter electrode CT is formed on the upper surface of the over coat film OC and the spacers SOC are formed on a surface of the counter electrode CT.

In the above description of Embodiment 1, reference has been made to a pixel arrangement in which pixel electrodes are formed on one transparent substrate SUB1 and counter electrodes are formed on the other transparent substrate SUB2, and voltages are applied to the liquid crystal interposed between the pixel electrodes and the counter electrodes (whereby the directions of electric fields become perpendicular to the substrates).

However, the invention can be applied to the arrangement in which pixel electrodes and counter electrodes are formed on one transparent substrate and voltages are applied to the liquid crystal between the pixel electrodes and the counter electrodes (whereby the liquid crystal is driven by electric field components nearly parallel to the substrates).

This is because no matter what the arrangement of pixels is, it is similarly necessary to prevent the gap between the transparent substrates, that is, the thickness of the liquid crystal, from differing among individual locations of the display area.

Figure 6:
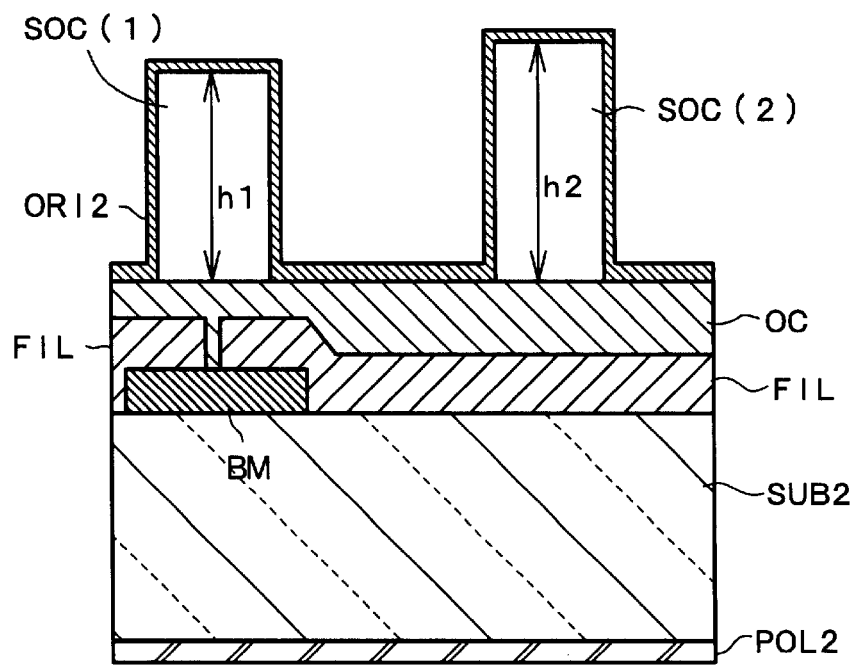
FIG. 6 is a cross-sectional view of the essential portion of another embodiment of the liquid crystal display device according to the invention.

FIG. 6 is a view corresponding to FIG. 1, and shows the latter type of pixel arrangement. FIG. 6 is similar to FIG. 1, except that the counter electrode CT is not formed on the transparent substrate SUB2.

Embodiment 2

In the case of the above-described Embodiment 1, since different materials are used for different kinds of spacers, selective etching using a photolithography technique must be performed twice during the fabrication of the spacers.

However, it is possible to obtain a similar advantage by performing selective etching using a photolithography technique once when a foundation layer to form spacers has a difference in surface level and the plan shapes of the respective spacers (the cross-sectional shapes of the respective spacers transverse to the central axes thereof are changed so as to control the elasticities of the respective spacers themselves.

Figure 7:
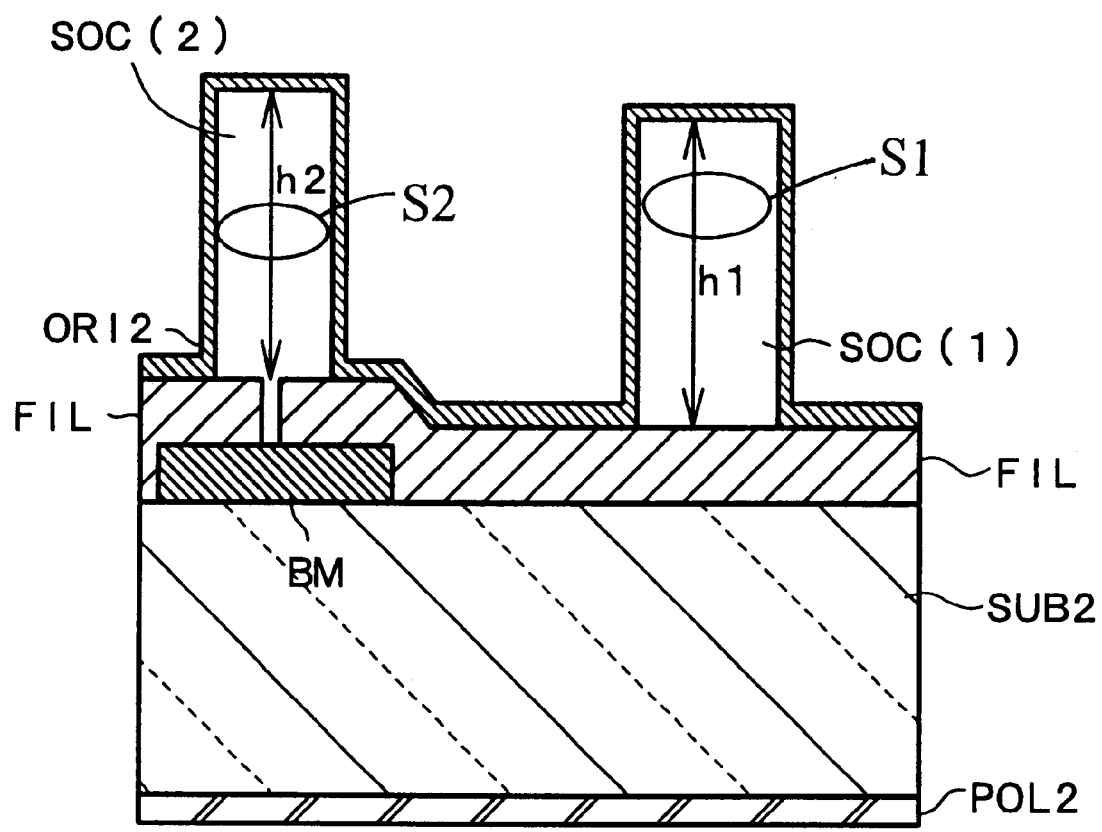
FIG. 7 is a cross-sectional view of the essential portion of the other embodiment of the liquid crystal display device according to the invention.

FIG. 7 is a view showing a construction formed in this manner, and is a view corresponding to FIG. 6. As shown in FIG. 7, the over coat film OC is not formed, whereby a step due to the black matrix BM is positively formed.

The spacer SOC(1) is formed on a lower portion of the step, and the area of this spacer SOC(1) (the cross-section area of the spacer SOC(1) thereof transverse to the central axis thereof is made $S_1$. The spacer SOC(2) is formed on an upper portion of the step, and the area of the spacer SOC(2) is made $S_2 (<S_1)$.

By forming the spacers SOC(1) and SOC(2) in this manner, even if the materials of the spacers SOC(1) and SOC(2) are the same, the apparent height of the spacer SOC(2) can be made large and, in addition, the elasticity of the spacer SOC(2) can be made large.

Similarly, in the construction of Embodiment 1, the heights of both kinds of spacers may, of course, be made the same by forming either of the kinds of spacers at an upper location of a step with respect to the other kind of spacer.

In accordance with any of the liquid crystal display devices according to the above-described embodiments, the gap between the transparent substrates SUB1 and SUB2 can be kept uniform irrespective of whether the temperature of the device is normal temperature or high temperature.

As is apparent from the foregoing description, in accordance with the liquid crystal display device according to the invention, the gap between transparent substrates can be kept uniform irrespective of whether the temperature of the device is normal temperature or high temperature.

What is claimed is:

1. A liquid crystal display device comprising:
    a vessel made of transparent substrates being secured by a sealing material to each other and opposed to each other;
    a liquid crystal layer sealed in said vessel between said transparent substrates;
    a display part made of multiple pixel areas arranged in a spreading direction of said liquid crystal layer within said vessel; and
    a plurality of spacers formed in said display part and secured to one of said transparent substrates, said plurality of spacers including first spacers and second spacers,
    wherein said first spacers are formed higher than said second spacers before said transparent substrates are secured to each other, and said first spacers are more flexible than said second spacers so as to become shorter after said transparent substrates are secured to each other such that said first spacers maintain intimate contact with another of said transparent substrates even after said liquid crystal layer is thermally expanded so that a gap between said transparent substrates becomes greater than heights of said second spacers.

2. A liquid crystal display device according to claim 1, wherein said first spacers are formed of a material whose elasticity is higher than that of said second spacers, and respectively formed on upper portions of steps on said one of said transparent substrates.

3. A liquid crystal display device comprising:
    a vessel made of transparent substrates being secured by a sealing material to each other and opposed to each other;
    a liquid crystal layer sealed in said vessel between said transparent substrates;
    a display part made of multiple pixel areas arranged in a spreading direction of said liquid crystal layer within said vessel; and
    a plurality of spacers formed in said display part to be secured to said one of said transparent substrates, said plurality of spacers including first spacer and second spacers;
    wherein said first spacers are shaped to have higher elasticity than said second spacers,
    said one of said transparent substrates has difference thickness in said display part, and
    said first spacers are disposed on a thicker portion of said one of said transparent substrates than another portion where said second spacers are disposed such that said first spacers are formed higher than said second spacers before said transparent substrates are secured to each other, and said first spacers become shorter after said transparent substrates are secured to each other such that said first spacers maintain intimate contact with another of said transparent substrate irrespective of thermal expansion of said liquid crystal layer.

4. A liquid crystal display device according to claim 3, wherein said first spacers and said second spacers are made of the same material.

5. A liquid crystal display device according to claim 1, wherein the area of a cross-sectional shape transverse to the central axis of each of said first spacers is made larger than the area of a cross-sectional shape transverse to the central axis of each of said second spacers.

6. A liquid crystal display device according to claim 3, wherein the area of a cross-sectional shape transverse to the central axis of each of said first spacers is made larger than the area of a cross-sectional shape transverse to the central axis of each of said second spacers.

* * * * *